(12) United States Patent
Mizukoshi (10) Patent No.: US 8,557,161 B2
(45) Date of Patent: Oct. 15, 2013

(54) IN-MOLD LABEL CONTAINER WITH RIB AND METHOD OF MANUFACTURING THE SAME

(75) Inventor: Koubu Mizukoshi, Tokyo (JP)

(73) Assignee: K.M. Planning Co., Ltd., Tokyo (JP)

( * ) Notice: Subject to any disclaimer, the term of this patent is extended or adjusted under 35 U.S.C. 154(b) by 5 days.

(21) Appl. No.: 13/308,001

(22) Filed: Nov. 30, 2011

(65) Prior Publication Data

US 2012/0139158 A1    Jun. 7, 2012

Related U.S. Application Data

(62) Division of application No. 11/596,390, filed as application No. PCT/JP2005/009161 on May 19, 2005, now abandoned.

(30) Foreign Application Priority Data

May 19, 2004   (JP) .................................. 2004-149122

(51) Int. Cl.
*B29C 45/00* (2006.01)
*B65D 81/38* (2006.01)

(52) U.S. Cl.
USPC ..................................................... 264/279.1

(58) Field of Classification Search
CPC ......................... B29C 45/0046; B65D 81/3865
USPC ..................................................... 264/279.1
See application file for complete search history.

(56) References Cited

U.S. PATENT DOCUMENTS 5,332,542 A  *  7/1994  Yamanaka et al. ............ 264/509
5,779,841 A       7/1998  Yamanaka
6,150,013 A      11/2000  Balaji et al.

FOREIGN PATENT DOCUMENTS

| EP | 0 481 090 A1 | 4/1992 |
| JP | A-2000-264327 | 9/2000 |
| JP | A-2000-281038 | 10/2000 |
| JP | A-2003-034369 | 2/2003 |

OTHER PUBLICATIONS

"Process Control, Injection Molding Handbook". Rosato, D; Rosato, D; Rosato, M. Springer, 2000, p. 703, accessed: http://books.google.com/books?id=15jqDRauKNYC&lpg=PA702&ots=O_VXjlhUu9&dq=injection%20molding%20fill%20time%20pressure&pg=PA703#v=onepage&q&f=false on Jan. 25, 2013.*

Jul. 6, 2011 Office Action issued in European Patent Application No. 05740912.0.

* cited by examiner

*Primary Examiner* — Yogendra Gupta
*Assistant Examiner* — Alison Hindenlang
(74) *Attorney, Agent, or Firm* — Oliff & Berridge, PLC (57) ABSTRACT

An in-mold label container with ribs enabling an increase in heat insulation property against a temperature on the inside of the container and an increase in heat absorbing property against a temperature on the outside of the container and a method of manufacturing the container. In the in-mold label container (1) with the ribs, a resin container body (1a) having the plurality of ribs (5) on the side face (2) outer periphery thereof is formed integrally with a label (6) disposed on the side face (2) outer periphery of the container body (1a). The label (6) is holdingly installed between a resin portion on the container body (1a) side and a resin portion on the rib (5) side. Normally, the label (6) is formed of a material higher in heat insulation property or heat absorbing property than the resin of the container body (1a).

7 Claims, 11 Drawing Sheets

IN-MOLD LABEL CONTAINER WITH RIB AND METHOD OF MANUFACTURING THE SAME

This application is a divisional of U.S. patent application Ser. No. 11/596,390, filed on Jul. 13, 2007, which is a U.S. National Phase of PCT/JP2005/009161, filed May 19, 2005, which claims priority to Japan Patent Application No. 2004-149122 filed on May 19, 2004. The entire disclosure of the prior applications is hereby incorporated herein by reference in their entirety.

TECHNICAL FIELD

The present invention relates to a ribbed in-mold label container constructed and obtained by integrally molding a resinous container body having a plurality of projection-type ribs on an outer periphery of a lateral surface thereof and a label disposed on the outer periphery of the lateral surface of the container body.

BACKGROUND ART

Conventionally, there has been known a resinous (plastic) container having a plurality of projection-type ribs on an outer periphery of a lateral surface thereof. The ribs have a function of making it easy to hold the container by hand when a high-temperature content is put therein. There has also been known a container having a label, which serves to attach an aesthetic quality of a pictorial pattern or the like, disposed on an outer periphery of a lateral surface thereof.

For example, a ribbed in-mold label container disclosed in Patent Document 1 is obtained by disposing a label on a lateral surface of the container, integrating a body of the container with the label, and carrying out in-mold forming.
Patent Document 1: JP 2000-264327 A

DISCLOSURE OF THE INVENTION

Problems to be Solved by the Invention

In the container disclosed in Patent Document 1, however, an inner wall of the container and ribs formed on the container are made of the same material and equal in heat conductivity. It is therefore difficult to increase the heat insulating capacity against a temperature inside the container or the heat absorbing capacity against a temperature outside the container. In a case of the container disclosed in Patent Document 1, for example, if the height of the ribs is increased enough to easily hold the container by hand regardless of the temperature of the content with a view to increasing the heat insulating capacity, there arises a new problem in that the appearance of the container becomes undesirable.

Further, the container disclosed in Patent Document 1 is structured such that the label is fitted thereon through regions of the ribs, so end surfaces of the label are exposed. As a result, the advanced printing technology is lost, so there also arises a problem in that the container assumes an aesthetically undesirable feature.

The present invention has been made in consideration of the above-mentioned problems, and it is therefore a technical task of the present invention to provide a ribbed in-mold label container allowing the heat insulating capacity against a temperature inside the container or the heat absorbing capacity against a temperature outside the container to increase, and a method of manufacturing the ribbed in-mold label container.

Means for Solving the Problems

A ribbed in-mold label container according to the present invention and a method of manufacturing the ribbed in-mold label container are designed as follows so as to achieve the aforementioned technical task.

That is, according to the present invention, there is provided a ribbed in-mold label container constructed and obtained by integrally molding a resinous container body having a plurality of projection-type ribs on an outer periphery of a lateral surface thereof and a label disposed on the outer periphery of the lateral surface of the container body, in which the label is sandwiched between a resin segment on a container body side and a resin segment on a ribs side.

Further, according to the present invention, there may be exemplified a ribbed in-mold label container, in which the label is formed using a material exhibiting a higher heat insulating capacity or a higher heat absorbing capacity than a material of the resin. Further, according to the present invention, there may be exemplified a ribbed in-mold label container, in which the ribs are formed over an entirety of the outer periphery of the lateral surface in a direction perpendicular to a circumferential direction thereof.

Further, according to the present invention, there is provided a method of manufacturing a ribbed in-mold label container, including: preparing an injection molding die for molding a container body having a plurality of projection-type ribs on an outer periphery of a lateral surface thereof; disposing a label at such a position within the injection molding die so that the label serves as the outer periphery of the lateral surface of the container body; and injecting a resin into the injection molding die to integrally mold the container body and the label, in which: by injecting the resin into the injection molding die, on which the label is disposed, the resin is caused to flow to both sides of the label and form the ribs and the container body on an outer peripheral side and an inner peripheral side of the label respectively; and the label is sandwiched between a resin segment on the container body side and a resin segment on the ribs side to integrate the label with the container body.

Here, the label may be pressed toward an outer peripheral surface of a core of the injection molding die or an inner peripheral surface provided on a cavity side due to a shearing speed and/or a shearing pressure of the poured resin and then destroyed, whereby the resin is caused to flow to both the sides of the label.

Effect of the Invention

According to the present invention, the label is sandwiched between the resin segment on the container body side and the resin segment on the ribs side. It is therefore possible to provide a ribbed in-mold label container allowing the heat insulating capacity against a temperature inside the container or the heat absorbing capacity against a temperature outside the container to increase, and a method of manufacturing the ribbed in-mold label container, by making the label out of a material exhibiting a higher heat insulating capacity or a higher heat absorbing capacity than the material of the resin.

Further, according to the present invention, the label is sandwiched between the resin segment on the container body side and the resin segment on the ribs side, so the end surfaces of the label are not exposed. It is therefore possible to provide a ribbed in-mold label container with an appearance of high aesthetic quality.

DESCRIPTION OF SYMBOLS 1 ribbed in-mold label container
1*a* container body
2 lateral surface
3 bottom surface
4 flange portion
5 rib
6 label
7 injection molding die
8 cavity
9 core
10 gate portion
11 vacuum slit
12 bottom
13 stripper

BEST MODES FOR CARRYING OUT THE INVENTION

Best embodiments according to the present invention will be described hereinafter in detail with reference to the drawings. To make the description simple, corresponding components or portions having the same function in the respective drawings are each denoted by the same reference symbols.

[Embodiment 1]

(Structure of Ribbed In-Mold Label Container)

Figure 1:
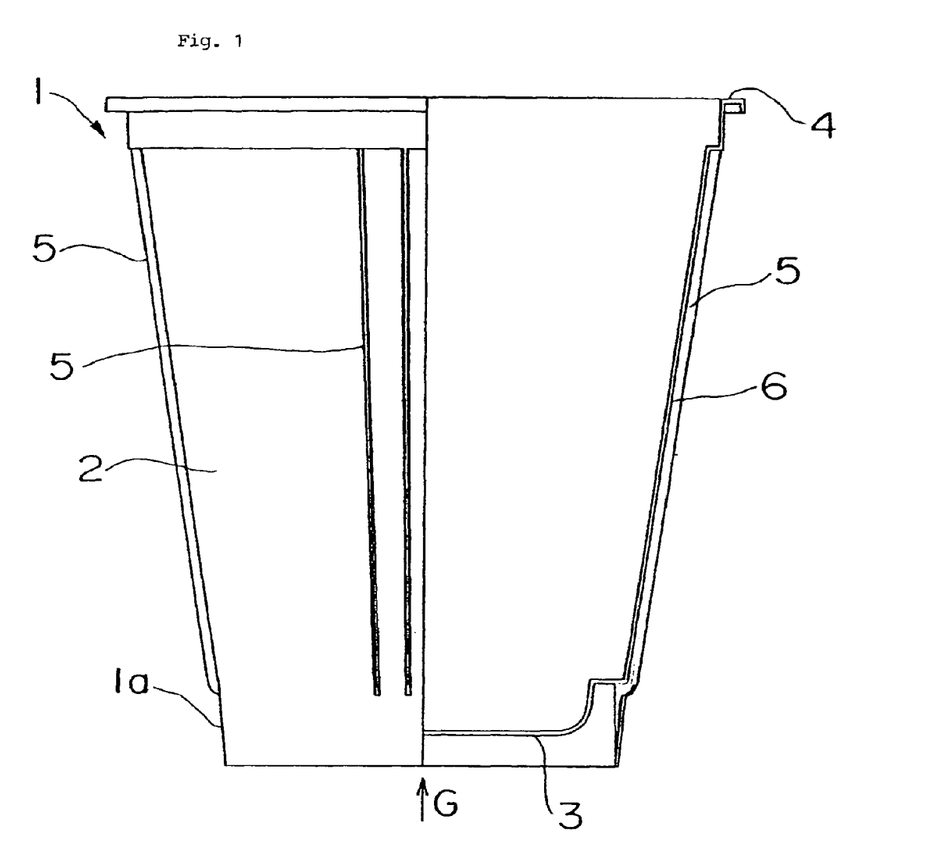
[FIG. 1] A partially broken lateral view of a ribbed in-mold label container according to the present invention.
Figure 2:
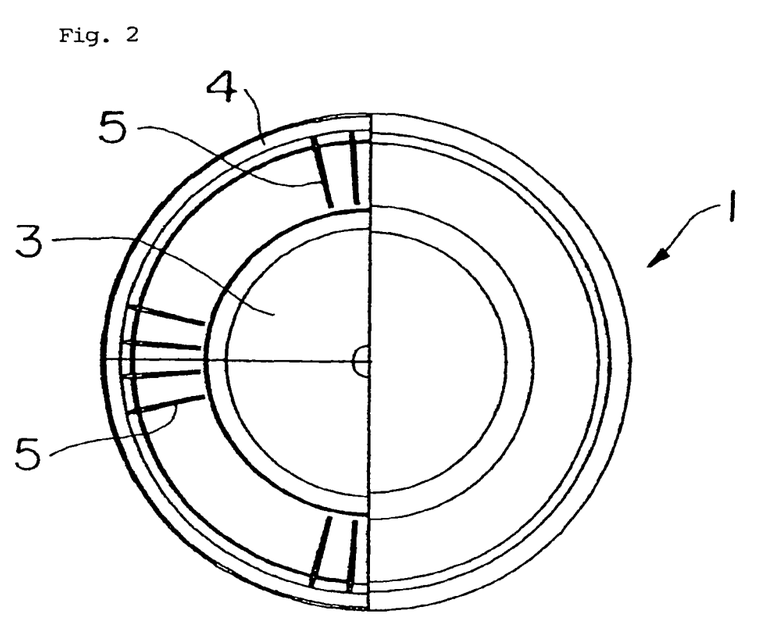
[FIG. 2] A view of the ribbed in-mold label container, showing a bottom thereof on a left-half side, and a surface thereof on a right-half side.

As shown in FIGS. 1 and 2, a ribbed in-mold label container 1 according to the present invention is a cup-shaped resinous container with a container body 1a having a circular bottom surface 3.

As shown in FIG. 1, the ribbed in-mold label container 1 has a flange portion 4 at an upper end thereof. Projection-type ribs 5 are provided in a vertical direction (which is perpendicular to a circumferential direction) on at least a part of a lateral surface 2 of the container 1. In Embodiment 1 of the present invention, four of the ribs 5 are provided at each location so as to assume a cruciform shape when viewed from a bottom surface of the container. Each of the ribs 5 has a rectangular cross-sectional shape. That is, each of the ribs 5 has a lateral surface rising substantially at 90° from the lateral surface 2 of the container body 1*a*. The ribs 5 are provided at intervals such that hands and fingers gripping the container 1 do not come into direct contact with the lateral surface 2 of the container body 1*a*.

In a case where the container 1 is used while being held by the hands and fingers, the ribs 5 prevent the hands and fingers from coming into direct contact with the lateral surface 2 even when a high-temperature content such as boiling water is put into the container. Thus, the ribs 5 have a function of making the transfer of heat to the hands and fingers difficult.

The shape of the ribs 5 is not limited to a rectilinear shape. For instance, the ribs 5 may assume an undulate shape, a zigzag shape, or the like. The direction of the ribs 5 is not limited to the vertical direction either. For instance, the ribs 5 may extend in a lateral direction, a diagonal direction, or the like.

Figure 3:
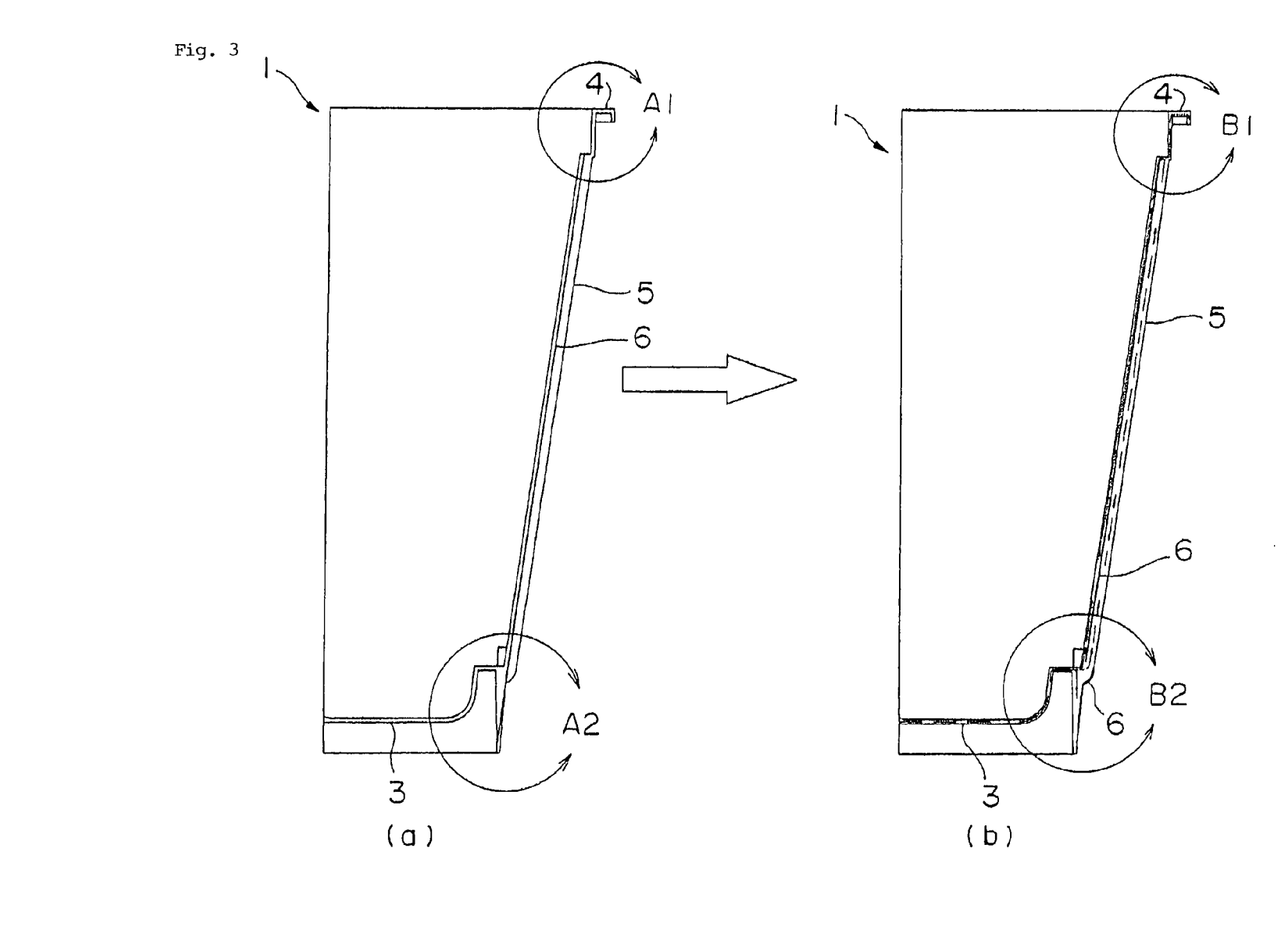
[FIG. 3] Lateral views of the ribbed in-mold label container, where part (a) shows a state before the flowage of resin and part (b) shows a state after the flowage of resin.
Figure 4:
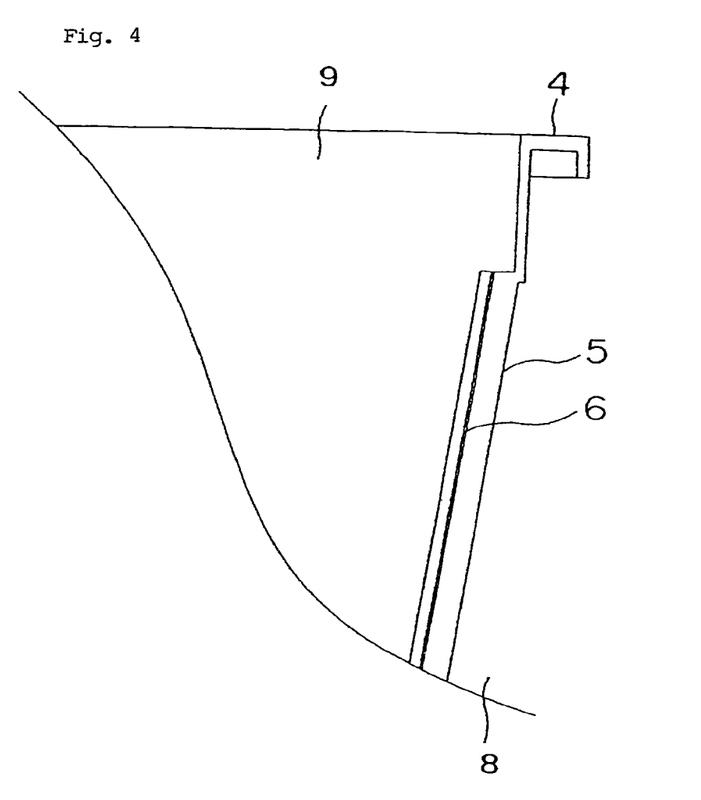
[FIG. 4] An enlarged view of a region A1 in FIG. 3(*a*).

As will be described later, the ribbed in-mold label container 1 according to Embodiment 1 of the present invention is manufactured through in-mold label forming, namely, by inserting a label 6 (see FIG. 3(*a*)) into a die for injection molding (hereinafter referred to as injection molding die) 10 (see FIG. 8) in advance and then injecting resin into the injection molding die (see FIG. 3(*b*)). In-mold label forming makes it possible to integrate the label 6 and the container body 1a with each other simultaneously with injection molding. At this moment, the label 6 is sandwiched between a resin segment on the container body side and a resin segment on the ribs side.

In the ribbed in-mold label container 1 according to Embodiment 1 of the present invention, the label 6 is provided so as to be located on an entirety of the lateral surface 2 of the container body 1*a*.

(Material of Label)

Two cases are possible in terms of the material of the label 6, which is in-mold-labeled. That is, the label 6 is either a film made of a material ensuring an increase in heat insulating capacity or a film made of a material ensuring an increase in heat absorbing capacity. However, the material of the label 6 is not specifically limited. That is, paper, aluminum foil, resin, or the like is used as the material of the label 6.

For example, in the case where the label 6 is the film made of the material ensuring an increase in heat insulating capacity, the label 6 is composed of four-layer materials, namely, an OPP film, an aluminum foil, a heat insulating film, and another OPP film, which are sequentially laminated from a surface of the label. The heat insulating film is a film ensuring an increase in heat insulating capacity, which is made of foamed plastic or the like. For example, in the case where the label 6 is the film made of the material ensuring an increase in heat absorbing capacity, the label 6 is composed of three-layer materials, namely, an OPP film, a heat absorbing film, and another OPP film, which are sequentially laminated from the surface of the label. The heat absorbing film is a film ensuring an increase in heat absorbing capacity, which is made of a metal such as aluminum foil.

This label 6 is formed as a four-layer film or a three-layer film, which is obtained by printing pictorial patterns, letters, and the like on back surfaces of OPP films, dry-laminating an aluminum foil as a barrier layer or a heat absorbing film thereon using an adhesive, and laminating the OPP films thereon as an outermost layer and an innermost layer respectively using the adhesive. In addition, the label 6 is formed by being punched out into a predetermined shape (sector shape corresponding to an entire circumference of a lateral surface in a region below lower-end lines of the ribs of the container body).

It has no preference whether drawn films or non-drawn films are to be used as the laminated films constituting the label 6. Both surfaces of each of the OPP films may have something printed thereon.

Figure 8:
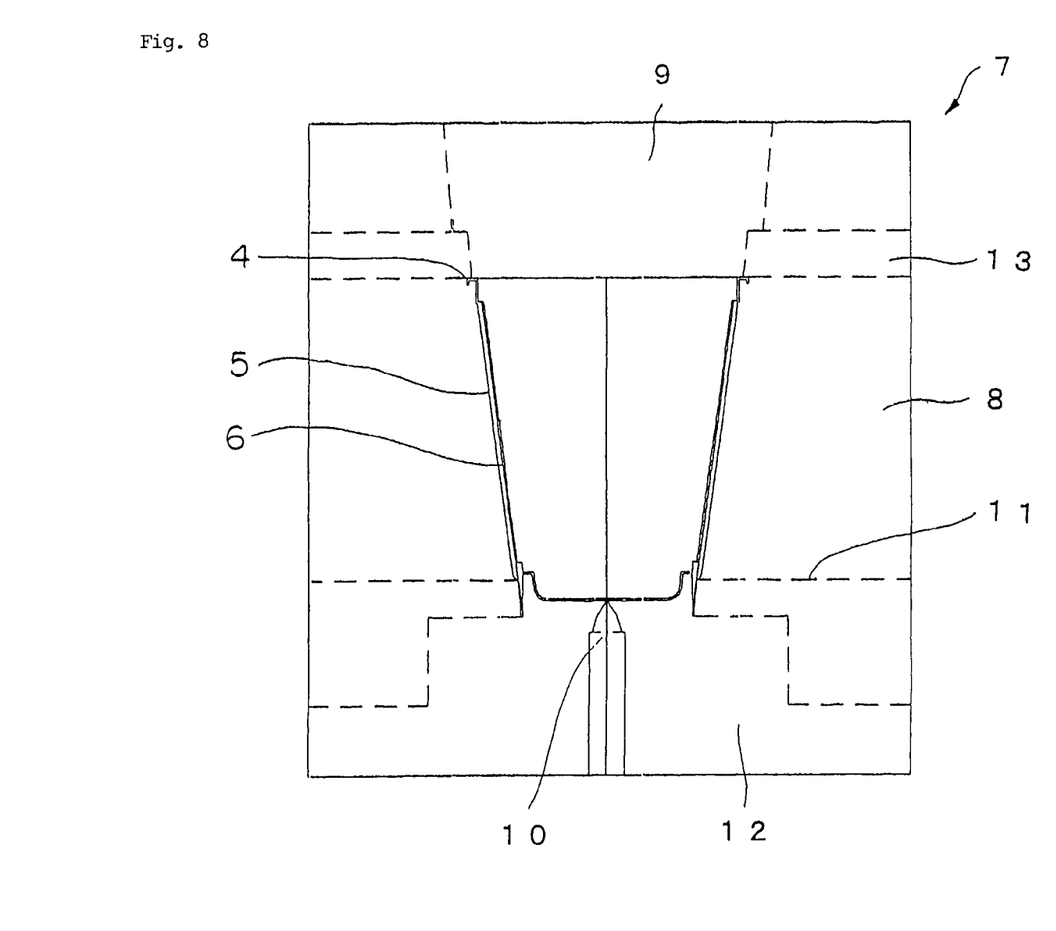
[FIG. 8] A schematic sectional view showing an injection molding die.

The label 6 constructed as described above is loaded in a space between a core 9 and a cavity 8 of the injection molding die 7 (see FIG. 8). The container 1 is produced by injecting and pouring resin at a melting temperature of, for example, 180 to 260° C. into the space and thereby causing the resin to flow to both sides of the label 6 and then form the container body 1a and the ribs 5. The container body 1a, whose shape is not limited to a circular shape, may assume the shape of a rectangular cup.

(Structure of Injection Molding Die)

Referring to FIG. 8, the cavity 8 of the injection molding die 7 has a depressed portion corresponding to the shape of the container body 1a, and a gate portion 10 is provided at a central position of a bottom area of the depressed portion. The core 9, which corresponds to the cavity 8, has a projecting portion and is designed as a movable member. The cavity 8 may also be provided with a vacuum slit 11 as a vacuum suction hole for the label 6. Referring to FIG. 8, reference numerals 12 and 13 denote a bottom and a stripper, respectively.

The injection molding die 7 is a so-called die for injection molding which is shaped and constructed in a known manner in this kind of technical field. The injection molding die 7 is divided into the core 9 side and the cavity 8 side, and molded resin serving as a container is press-fitted into a space between the core 9 and the cavity 8.

(Method of Manufacturing Ribbed In-Mold Label Container)

Next, a process of molding the ribbed in-mold label container according to the present invention will be described.

First of all in the injection molding die 7, as shown in FIG. 8, the core 9 and the stripper 13 are opened, and a pseudo core (not shown) around which the label 6 is wound in advance is inserted into the depressed portion of the cavity 8. At this moment, if necessary, vacuum suction is carried out from the vacuum slit 11 to load the label 6 at a predetermined position.

Subsequently, the pseudo core is removed from the cavity 8 with the label 6 loaded at the predetermined position. After that, the depressed portion of the cavity 8 is closed using the core 9 and the stripper 13.

Subsequently, molten resin, which is supplied from an injection molding machine (not shown), is injected from the gate portion 10 into the injection molding die 7. Then, the molten resin flows between the cavity 8 and the core 9. As a result, the label 6 is sandwiched between the resin segment on the container body side and the resin segment on the ribs side and thus integrated with the container body 1a.

Figure 5:
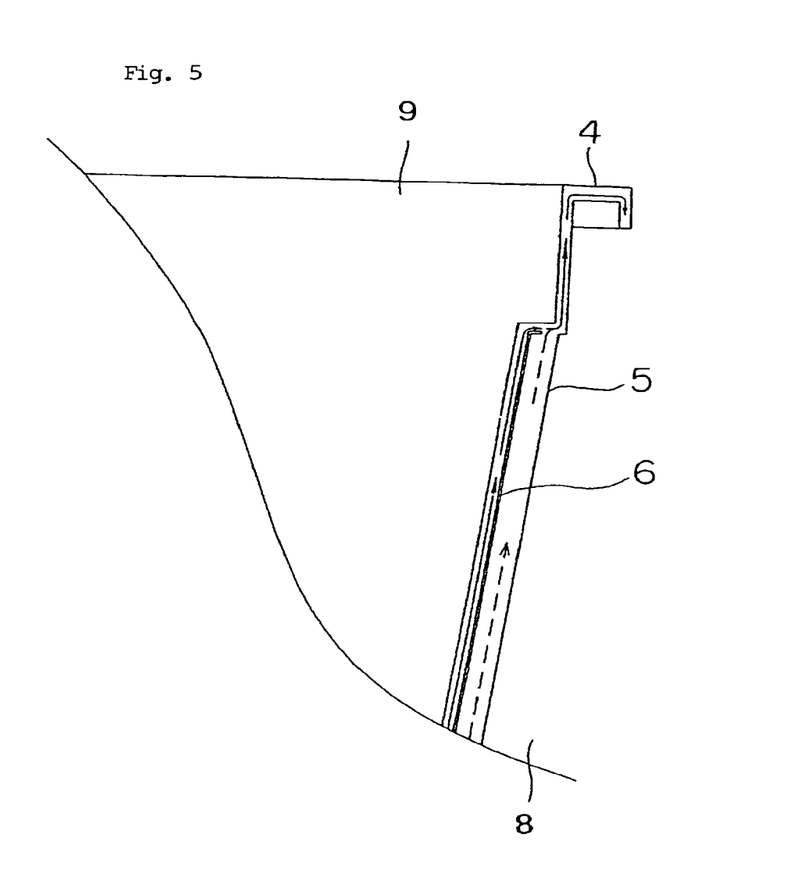
[FIG. 5] An enlarged view of a region B1 in FIG. 3(*b*).
Figure 6:
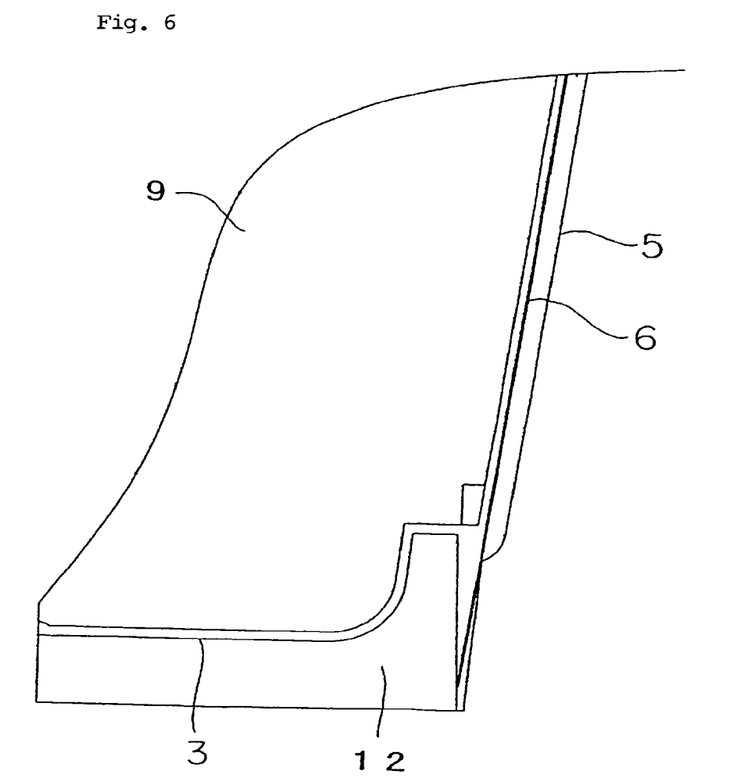
[FIG. 6] An enlarged view of a region A2 in FIG. 3(*a*).
Figure 7:
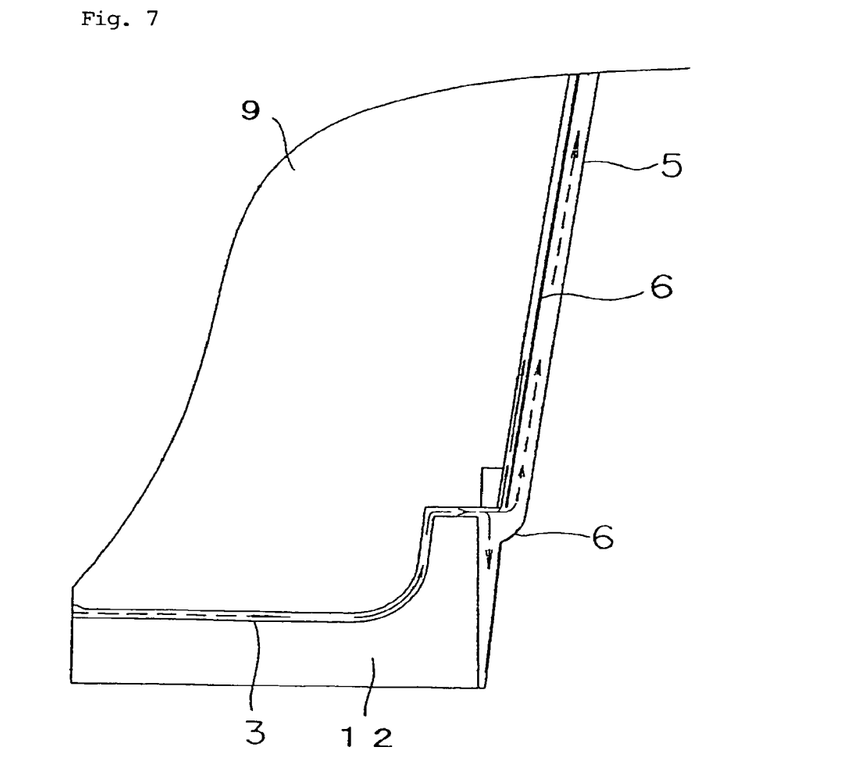
[FIG. 7] An enlarged view of a region B2 in FIG. 3(*b*).

As shown in FIGS. 5 and 7, the label 6 on a lateral wall surface side is pressed by a cavity 8 surface side (outside) at any position, thereby forming an outer peripheral surface of the lateral wall 2 of the container. On the other hand, due to injection pouring of the resin, the outer peripheral edge of the label 6 on the ribs 5 side is pressed by a lower-end outer peripheral surface of the core 9 or an inner peripheral surface provided on the cavity 8 side at a shearing speed and a shearing pressure of the poured resin, and then destroyed (see FIG. 7). Then, the resin diverges into a segment serving as the outer peripheral surface of the lateral wall 2 of the container and a segment serving as the ribs 5 across the label 6 and flows into the space between the core 9 and the cavity 8, so the label 6 is sandwiched between the resin segment on the container body side and the resin segment on the ribs side.

To ensure destruction of the label 6 through the pouring of the resin as described above, the filling time and filling pressure of the resin are normally set within a range of 0.2 to 1.0 second and a range of 98 to 235 MPa (1,000 to 2,400 kgf/cm$^2$), respectively.

Finally, the core 9 and the stripper 13 are opened to take out the ribbed in-mold label container 1 thus molded.

The resin is not absolutely required to be injected and poured from the cavity 8 side, but may also be injected and poured from the core 9 side.

(Material of Resin)

A soft synthetic resin or a hard synthetic resin, for example, PP, PS, polyester (PET), polyethylene (PE), or the like is used as the resin to be injected. By using those materials, a transparent container, a semi-transparent container, an opaque container, and the like can be molded.

If the resin to be injected and the laminated film serving as the label 6 are made of the same material, the container body 1a and the label 6 are formed (fused) more integrally.

The thickness of the container body 1a is approximately 0.6 to 1.0 mm.

According to Embodiment 1 of the present invention, the label 6 is sandwiched between the resin segment on the container body 1a side and the resin segment on the ribs 5 side. Therefore, the heat insulating capacity against the temperature inside the container or the heat absorbing capacity against the temperature outside the container can be increased by making the label 6 out of a material exhibiting a higher heat insulating capacity than the resin (e.g., foamed plastic film as a heat insulating film) or a material exhibiting a higher heat absorbing capacity (e.g., aluminum foil film as a heat absorbing film). In the case where the heat absorbing capacity against the temperature outside the container is increased, heat is absorbed via the label 6 simply by putting the container containing a content (soup or the like) into a heat retainer. As a result, the content can be warmed efficiently.

Further, according to Embodiment 1 of the present invention, the label 6 is sandwiched between the resin segment on the container body 1a side and the resin segment on the ribs 6 side, so the end surfaces of the label 6 are not exposed. Therefore, a printed part on the label 6 is not lost in appearance, and the aesthetic quality of the container can be enhanced through full use of printing technology.

[Embodiment 2]

Next, a ribbed in-mold label container 1 according to Embodiment 2 of the present invention will be described with reference to FIGS. 8 and 9.

Figure 9:
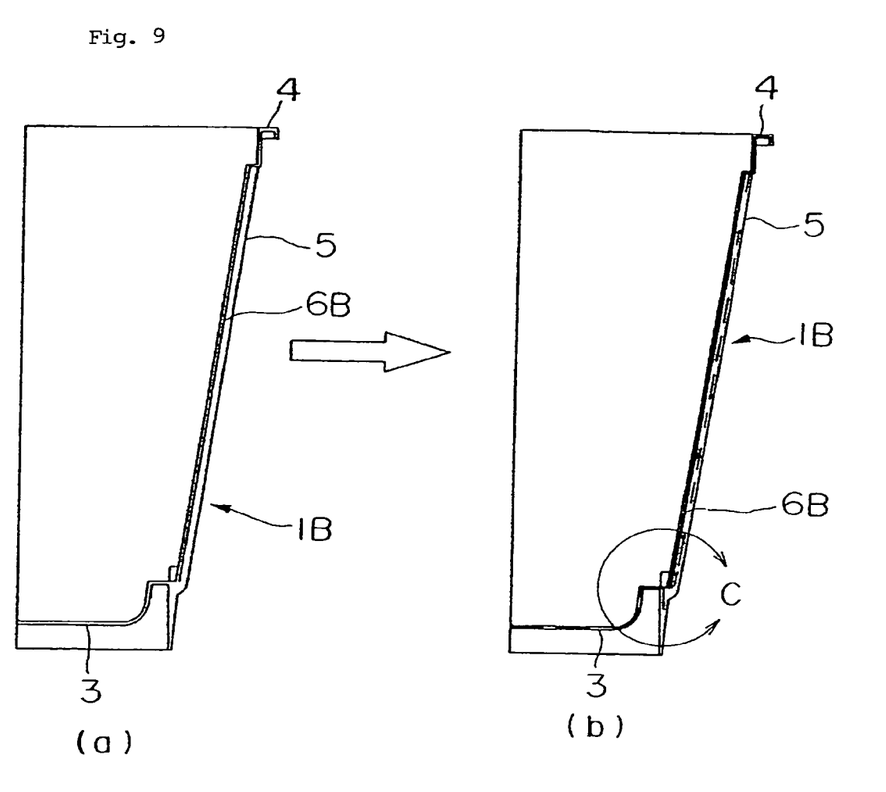
[FIG. 9] Lateral views of a ribbed in-mold label container according to Embodiment 2 of the present invention, where part (a) shows a state before the flowage of resin and part (b) shows a state after the flowage of resin.

As shown in FIGS. 8 and 9, the ribbed in-mold label container 1B according to Embodiment 2 of the present invention is formed such that a vertical dimension (length) of a label 6B is shorter than a dimension (length) of the ribs 5.

In a method of manufacturing the ribbed in-mold label container in this case, as shown in FIGS. 8 and 9, the label 6B on the lateral wall surface portion side is pressed, on either lateral wall surface portion thereof, by a surface of the cavity 8 and serves as the outer peripheral surface of the lateral wall 2 of the container. On the other hand, as for the label 6B on the ribs 5 side, the resin diverges, through the injection pouring thereof, into the segment serving as the outer peripheral surface of the lateral wall 2 of the container and the segment serving as the ribs 5 across the label 6B and flows into the space between the core 9 and the cavity 8, so the label 6 is sandwiched between the resin segment on the container body side and the resin segment on the ribs side.

[Embodiment 3]

Figure 10:
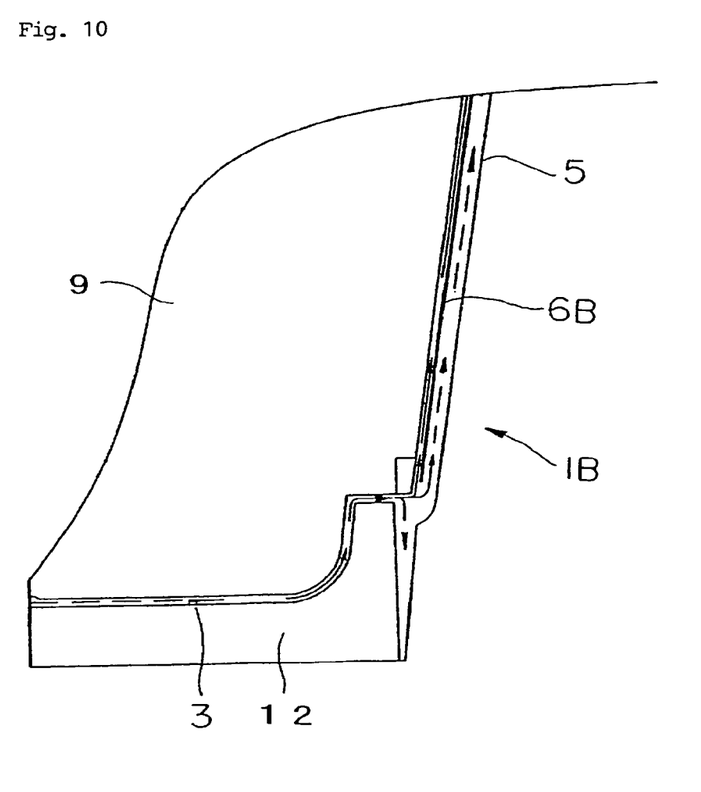
[FIG. 10] An enlarged view of a region C in FIG. 9(*b*).

Next, a ribbed in-mold label container 1C according to Embodiment 3 of the present invention will be described with reference to FIG. 10.

The ribbed in-mold label container 1C according to Embodiment 3 of the present invention is formed such that a vertical dimension (length) of a label 6C is longer than a dimension (length) of ribs 5.

Figure 11:
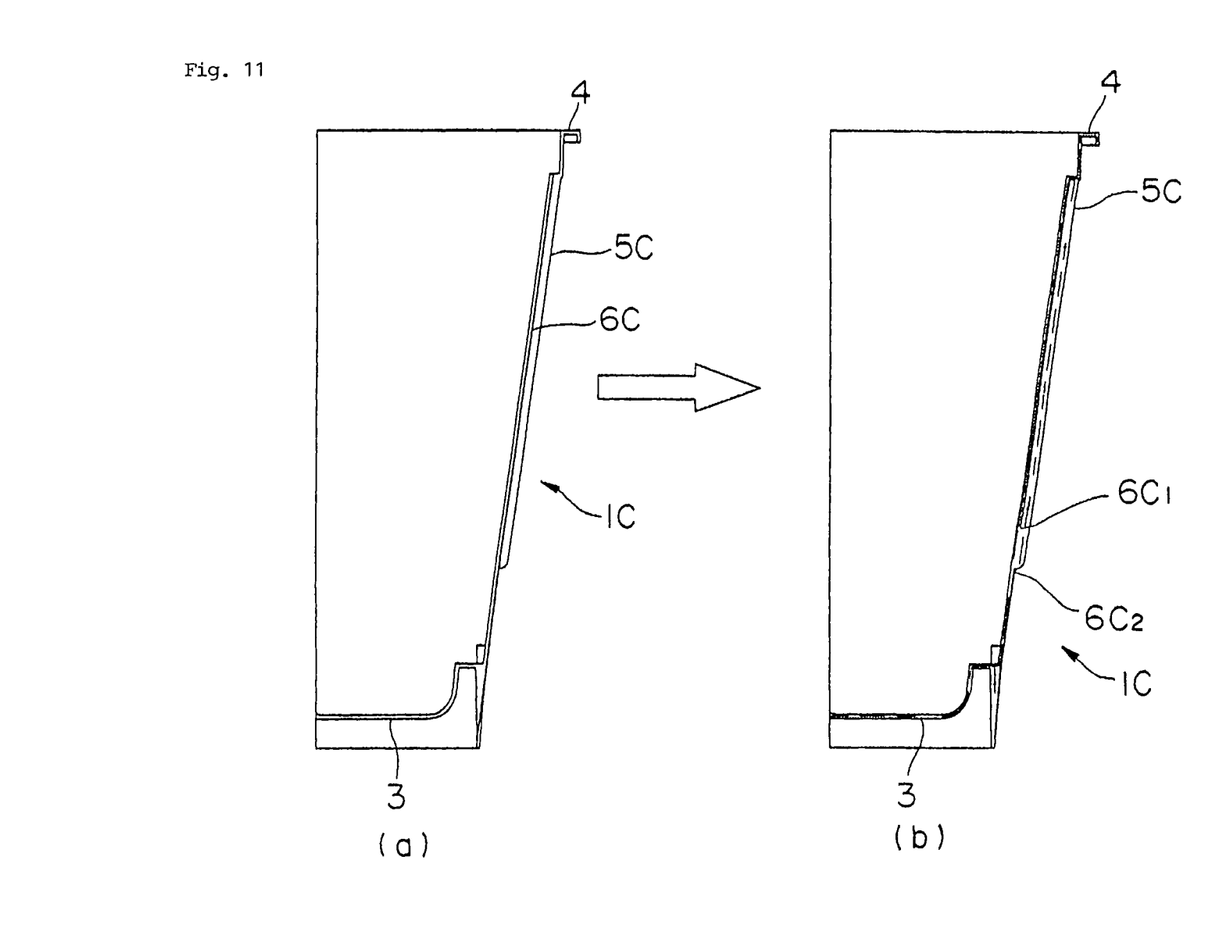
[FIG. 11] Lateral views of a ribbed in-mold label container according to Embodiment 3 of the present invention, where part (a) shows a state before the flowage of resin and part (b) shows a state after the flowage of resin.

In a method of manufacturing the ribbed in-mold label container in this case, the label 6C on the lateral wall surface portion side is pressed, on either lateral wall surface portion thereof, by the surface of the cavity 8 and serves as the outer peripheral surface of the lateral wall 2 of the container. On the other hand, an outer peripheral edge of the label 6C on the ribs 5C side is pressed, through the injection pouring of the resin, by the lower-end outer peripheral surface of the core 9 or an inner peripheral surface provided on the cavity 8 side at a shearing speed and a shearing pressure of the poured resin, and then destroyed (see FIG. 11(b)). Then, the resin diverges into a segment serving as the outer peripheral surface of the lateral wall 2 of the container and a segment serving as the ribs 5C across the label 6C and flows into the space between the core 9 and the cavity 8, so the label 6C is sandwiched between the resin segment on the container body side and the resin segment on the ribs side.

INDUSTRIAL APPLICABILITY

The present invention provides a resinous container exhibiting an excellent heat insulating capacity against an outer surface thereof, which is gripped by a user, and an inside thereof. The container can be widely used as a simple container for containing various contents such as high-temperature beverages.

The invention claimed is:

1. A method of manufacturing a ribbed in-mold label container, comprising:
    preparing an injection molding die for molding a container body having a plurality of projection-type ribs on an outer periphery of a lateral surface thereof;
    disposing a label at such a position within the injection molding die so that the label serves as the outer periphery of the lateral surface of the container body; and
    injecting a resin into the injection molding die to integrally mold the container body and the label, wherein:
        by injecting the resin into the injection molding die, on which the label is disposed, the resin is caused to flow to both sides of the label and form the ribs and the container body on an outer peripheral side and an inner peripheral side of the label respectively;
        the label is pressed toward an outer peripheral surface of a core of the injection molding die or an inner peripheral surface provided on a cavity side due to a shearing speed and/or a shearing pressure of the injected resin and then destroyed, whereby the resin is caused to flow to both sides of the label;
        the ribs are formed from the resin that partly destroys the label so that resin penetrates the label and flows along an outside of the label at a time of injection molding;
        the ribs are separated from the container body except for at least one end; and
        the label is sandwiched between the container body and the ribs.

2. A method of manufacturing a ribbed in-mold label container according to claim 1, wherein the container is produced by injecting resin at a melting temperature into the space and thereby causing the resin to flow to both sides of the label and then form the container body and the ribs.

3. A method of manufacturing a ribbed in-mold label container according to claim 1, wherein the filling time and filling pressure of the resin are set within a range of 0.2 to 1.0 second and a range of 98 to 235 MPa (1,000 to 2,400 kgf/cm), respectively.

4. A method of manufacturing a ribbed in-mold label container according to claim 1, wherein the label is the film made of the material ensuring an increase in heat insulating capacity, the label is composed of four-layer materials, namely, an oriented polypropylene (OPP) film, an aluminum foil, a heat insulating film, and another OPP film, which are sequentially laminated from a surface of the label.

5. A method of manufacturing a ribbed in-mold label container according to claim 4, wherein the heat insulating film is a film ensuring an increase in heat insulating capacity, which is made of foamed plastic.

6. A method of manufacturing a ribbed in-mold label container according to claim 1, wherein the label is the film made of the material ensuring an increase in heat absorbing capacity, the label is composed of three-layer materials, namely, an oriented polypropylene (OPP) film, a heat absorbing film, and another OPP film, which are sequentially laminated from the surface of the label.

7. A method of manufacturing a ribbed in-mold label container according to claim 6, wherein the heat absorbing film is a film ensuring an increase in heat absorbing capacity, which is made of a metal.

\* \* \* \* \*